UNITED STATES PATENT OFFICE.

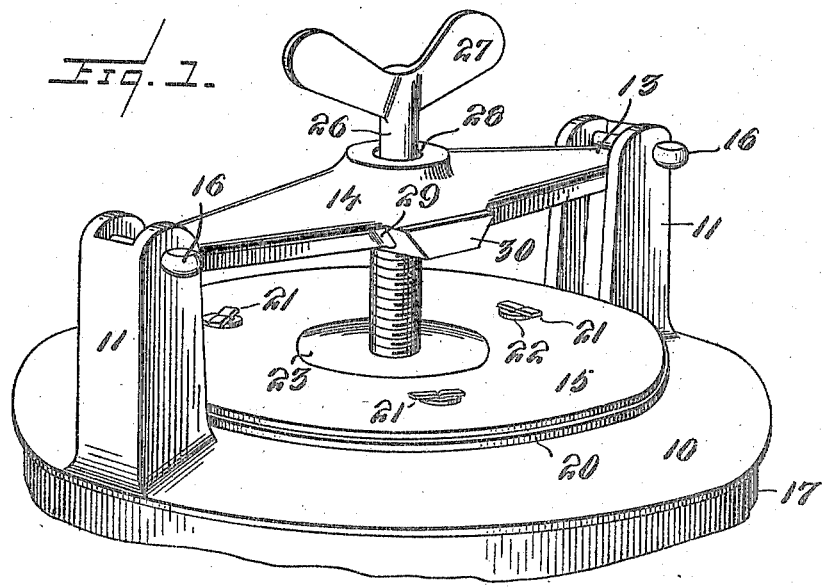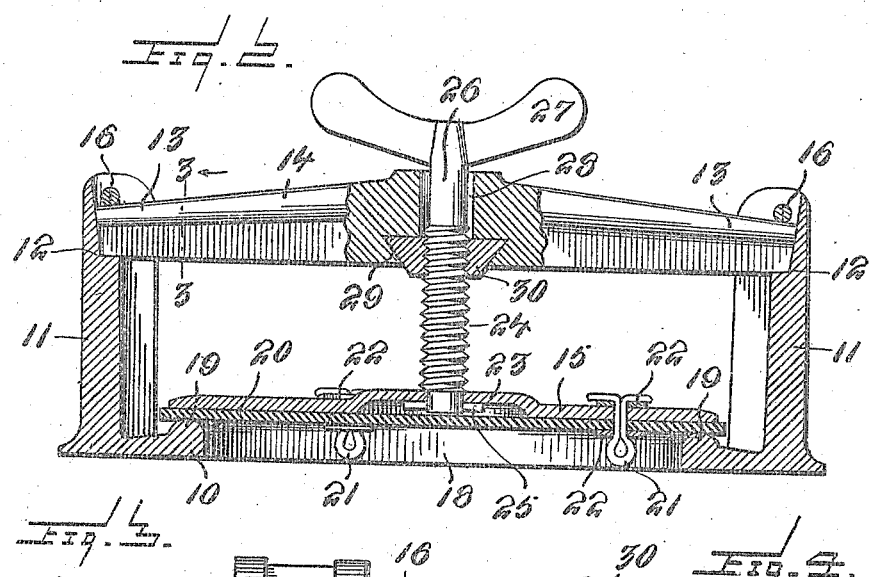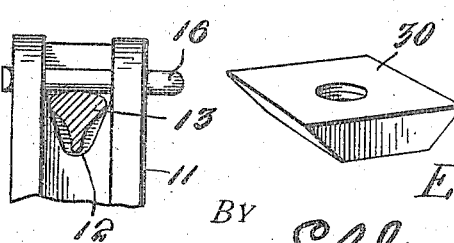

ELMER E. IZER, OF POMONA, CALIFORNIA.

IRRIGATING-VALVE.

957,777.	Specification of Letters Patent.	Patented May 10, 1910.

Application filed August 23, 1909. Serial No. 514,208.

*To all whom it may concern:*

Be it known that I, ELMER E. IZER, citizen of the United States, residing at Pomona, county of Los Angeles, State of California, have invented certain new and useful Improvements in Irrigating-Valves, of which the following is a specification, reference being had therein to the accompanying drawing.

This invention relates to a new and useful improvement in irrigating valves and is particularly adapted for application to stand pipes and for other purposes in connection with irrigating pipes.

The invention has for an object to provide a novel, simple and efficient construction of valve which can be adjusted to regulate the quantity of water flowing therethrough and is adapted to be removed when it is desired to flush the pipe or to permit an unobstructed flow therefrom.

A further object of the invention is to provide a construction embodying a non-rusting screw and nut which insure an easy operation of the valve regardless of infrequent use as the usual rusting and corrosion therefrom is prevented.

Other and further objects and advantages of the invention will be hereinafter set forth and the novel features thereof specifically defined by the appended claims.

In the drawing—Figure 1 is a perspective showing the valve applied; Fig. 2 is a central vertical section; Fig. 3 is a detail section on line 3—3 of Fig. 2; and Fig. 4 is a detail perspective of the removable nut.

Like numerals of reference refer to like parts in the several figures of the drawing.

The numeral 10 designates the valve frame which may be of any desired construction or configuration but is preferably annular as herein shown and provided with oppositely disposed posts 11 which extend at an angle therefrom and are each provided at its upper portion with a seat 12 preferably of U shaped form and adapted to receive the ends 13 of the cross-bar 14, these ends being of substantially triangular shape and engaging the seat 12 to prevent a lateral reciprocation of the bar while permitting a limited oscillation thereof in order that the valve 15 carried by the bar may accurately seat. The cross-bar is held against vertical movement in the seats or pockets 12 by means of removable pins 16 extending through the side walls of the posts. These pins may be of any desired construction, for instance a cotter pin as shown.

The valve frame 10 is adapted for application to a stand pipe or other part of an irrigating main for instance as shown at 17 in Fig. 1 and this frame is provided at the central opening 18 with a curved or convex valve seat 19 which secures a tight seat for the gasket 20 carried by the valve 15 and one upon which pebbles, sand or other materials will not lodge so as to prevent a proper seating of the valve. The gasket 20 may be removably attached to the valve by any desired means, a preferable form thereof being a cotter pin 21 extending through the gasket and valve and provided at opposite sides with bearings and washers 22. The valve 15 is provided at its center with a raised portion 23 to form a recess into which the lower end of the adjusting screw 24 extends and is swiveled by a removable pin 25.

The upper portion 26 of the screw 24 is provided with a handle 27 and extends through an enlarged aperture 28 formed in the cross-bar 14. At the lower portion of this aperture a seat 29 is formed, for instance dovetailed as shown in Fig. 2, and is adapted to receive the interiorly threaded nut 30 shown in Fig. 4 which is of similar form to the seat and held therein against vertical displacement. This nut is removable laterally when the screw is disconnected from the valve and unthreaded from the nut. The screw and nut are formed of non-rusting or non-corrodible material of any desired character, for instance brass and permit at all times a free operation of the screw even though the valve be only frequently used.

In the operation of the valve it will be seen that it can be adjusted to allow the flow of any desired quantity of water from the pipe line or stand pipe by an adjustment of the screw which raises the valve, while the flow may be entirely cut off and the valve held in contact with its seat when the parts are in position shown in Fig. 2. When it is desired to use the entire capacity of the pipe, for instance in flushing or to obtain a free and unobstructed flow therefrom to remove rubbish lodged in the pipe, the cross-bar and valve carried thereby can be instantly removed by withdrawing the removable pins in one or both of the posts.

The fastenings for the different parts of the valve are also readily removable and require no special tools or experience to repair or operate the parts thereof while they comprise a very economically constructed valve which is effective and substantial in use. The mounting of the bar in the pockets provides for its central disposition and allows for sufficient oscillation to insure an accurate seating of the gasket upon the curved valve seat which will not retain foreign materials to interfere with the proper seating of the valve.

Having described my invention and set forth its merits what I claim and desire to secure by Letters Patent is—

1. In an irrigating valve, a frame provided with opposite posts having seats upon the inner faces thereof, a cross-bar having its opposite ends disposed in said seats, a feed screw carried by said bar, and a valve swiveled upon said screw to engage a seat upon said frame.

2. In an irrigating valve, a frame provided with opposite posts having seats upon the inner faces thereof, a cross-bar having its opposite ends disposed in said seats for lateral oscillation therein, a feed screw carried by said bar, a valve swiveled upon said screw to engage a seat upon said frame, and removable pins disposed in said posts above said bar.

3. In an irrigating valve, a frame provided with opposite posts having seats upon the inner faces thereof, a cross-bar having its opposite ends disposed in said seats for lateral oscillation therein, a feed screw carried by said bar, a valve swiveled upon said screw, a gasket upon the under face of said valve, and removable pins extended through said valve and gasket.

4. In an irrigating valve, a frame provided with a valve seat, posts carried by said frame, a cross-bar mounted on said posts and having a dovetailed socket upon its under face at the lower end of an aperture therethrough, an interiorly threaded dovetailed nut disposed in said socket, a feed screw mounted in said nut and provided with a handle above said bar, and a valve carried by said screw.

5. In an irrigating valve, a frame provided with a valve seat, opposite posts thereon having U shaped seats upon their inner face, a cross-bar having its opposite ends mounted for lateral oscillation in said seats, a feed screw carried by said bar, and a valve mounted upon said screw.

6. In an irrigating valve, a frame provided with a valve seat, opposite posts thereon having U shaped seats upon their inner face, a cross-bar having its opposite ends substantially triangular in cross section and mounted in said seats, a feed screw carried by said bar, and a valve mounted upon said screw.

7. In an irrigating valve, a frame provided with a circular convex valve seat, opposite posts upon said frame provided with seats upon their inner face, a cross-bar having its opposite ends mounted in said seats, removable pins disposed in said posts above the ends of said bar, a removable nut carried by said bar, a screw mounted in said nut, a valve plate provided with a central recessed portion, a removable connection carried by said screw within said portion, and a gasket carried by the under face of said valve plate.

In testimony whereof I affix my signature in presence of two witnesses.

ELMER E. IZER.

Witnesses:
WEBSTER KIRKPATRICK,
GEO. W. OGLE.